United States Patent [19]

Tamura

[11] 4,444,477
[45] Apr. 24, 1984

[54] AUTOMATIC FOCUS ADJUSTING DEVICE

[75] Inventor: Shuichi Tamura, Kanagawa, Japan

[73] Assignee: Canon Kabushiki Kaisha, Tokyo, Japan

[21] Appl. No.: 332,208

[22] Filed: Dec. 18, 1981

[30] Foreign Application Priority Data

Dec. 24, 1980 [JP] Japan .................................. 55-184859

[51] Int. Cl.³ ............................................. G03B 3/00
[52] U.S. Cl. ................................................... 354/403
[58] Field of Search .......................................... 354/25

[56] References Cited

U.S. PATENT DOCUMENTS

| | | | |
|---|---|---|---|
| 3,443,502 | 5/1969 | Harvey | 354/25 |
| 3,512,888 | 5/1970 | Humphrey | 354/25 X |
| 3,736,057 | 5/1973 | Harvey | 354/25 X |
| 4,065,778 | 12/1977 | Harvey | 354/25 |
| 4,274,735 | 6/1981 | Tamura et al. | 354/25 X |
| 4,351,590 | 9/1982 | Hirata et al. | 354/25 X |

*Primary Examiner*—Michael L. Gellner

*Attorney, Agent, or Firm*—Toren, McGeady and Stanger

[57] ABSTRACT

Disclosed is a zonal range finding apparatus for determining whether an object is located within a first range of distances from the apparatus or a second range of distances from the apparatus. The apparatus includes a radiation projecting device for projecting a beam of radiation toward an object, and a radiation receiving device for receiving radiation by the object. The receiving device is disposed at a distance of a predetermined base line length from the projecting device and having a radiation sensor which produces an electrical output corresponding to the received radiation. Further, a circuit determines, on a basis of the sensor output, whether the object is located within the first or second range. Also disclosed is an automatic focus adjusting device of an image forming optical system which uses an operation member which is manually displaced up to a position at which the member is displaceable in accordance with the distance signal from a distance measuring device with the member provided at the lens barrel of a camera.

11 Claims, 6 Drawing Figures

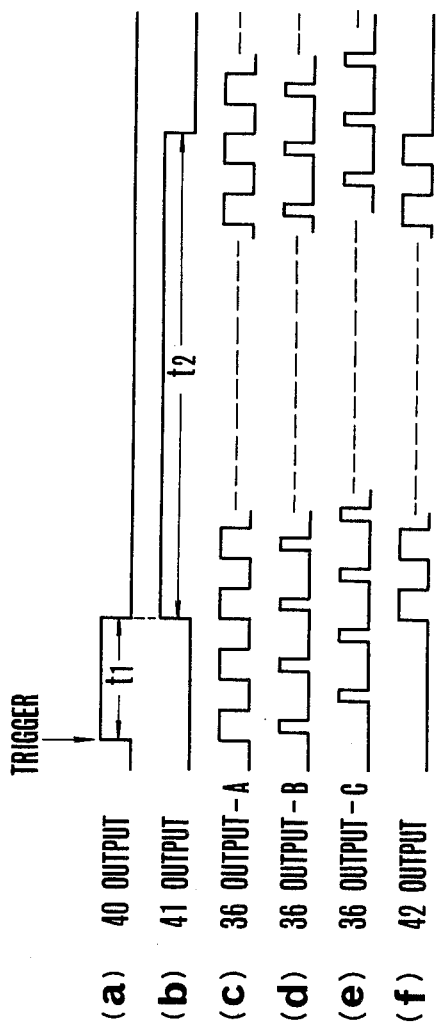

AUTOMATIC FOCUS ADJUSTING DEVICE

BACKGROUND OF THE INVENTION

1. Field of the Invention

This invention relates to an automatic focus adjusting device suited for use in optical instruments such as cameras.

2. Description of the Prior Art

In the past, automatic focus adjusting devices have been proposed in various forms. These automatic focus adjusting devices were all designed to have the function to substitute for the double image coincidence type distance meter or the zone focus mark which had so far been developed. Therefore, the electronic circuit and control mechanism were both very complicated and as a result, in cameras, a price increase was required. On the other hand, earlier designs have either proposed or put into practical use a focus adjusting provision for the objective lens having fixed focus, or the so-called fixed focus camera. This fixed focus camera, when used in certain limited conditions (for example, outdoor photography under fine weather) brings forth very good results, but otherwise often provides an unsatisfactory result.

SUMMARY OF THE INVENTION

The present invention has been made by considering the foregoing situations and is intended to provide an automatic focus adjusting device suited for use in optical instruments and particularly cameras having a device can solve the above-described drawbacks of the conventional types.

Another object of the present invention is to provide a novel automatic focus adjusting device of very simplified structure and, accordingly, which is adapted to very low unit cost production techniques, while nevertheless permitting the fully acceptable results to be effected sufficiently when in practical use.

And, to such end, according to the present invention, an automatic focus adjusting device is proposed which comprises one radiation projecting means and one radiation sensing means fixedly arranged in separation from each other by a predetermined base line length, and of which near and far distance zone focus settings, to which an objective lens is to be adjusted are determined depending upon the amount of radiation this sensor receives which has been emitted from the projecting means and returned by reflection.

A further additional object of the present invention is to provide an automatic focus adjusting device which can considerably reduce the power consumption as a simple active type device, while achieving the foregoing object, and thus is very suitable for a compact camera in particular.

A preferable embodiment according to the present invention, for achieving the above object, will have such an advantageous structure that the detection of the object zone is performed only for a predetermined time after connection to a power source, namely the radiation beam is projected from the radiation projecting means for a predetermined period of time while the reflected radiation is detected and memorized.

A further object of the present invention is to provide an improved automatic focus adjusting device which can satisfactorily avoid the adverse effects due to the transient instability of the power voltage level at the time of connection to the power source, in particular.

For this purpose, a preferred embodiment according to the present invention will have the advantageous structure that the detection of the object zone is prohibited during a predetermined period of time immediately after connection to a power source until the power voltage level is stabilized, namely, for example, the projection of the radiation beam from the projecting means is prohibited and/or the output of the radiation sensing means is nullified for the predetermined period of time.

These and other objects and features of the present invention will become apparent from the following detailed description of an embodiment thereof by reference to the accompanying drawings in which:

BRIEF DESCRIPTION OF THE DRAWINGS

FIG. 6 shows a waveform of voltages at the main portions of the circuit shown in FIG. 5.

DETAILED DESCRIPTION OF THE PREFERRED EMBODIMENT

Figure 1:
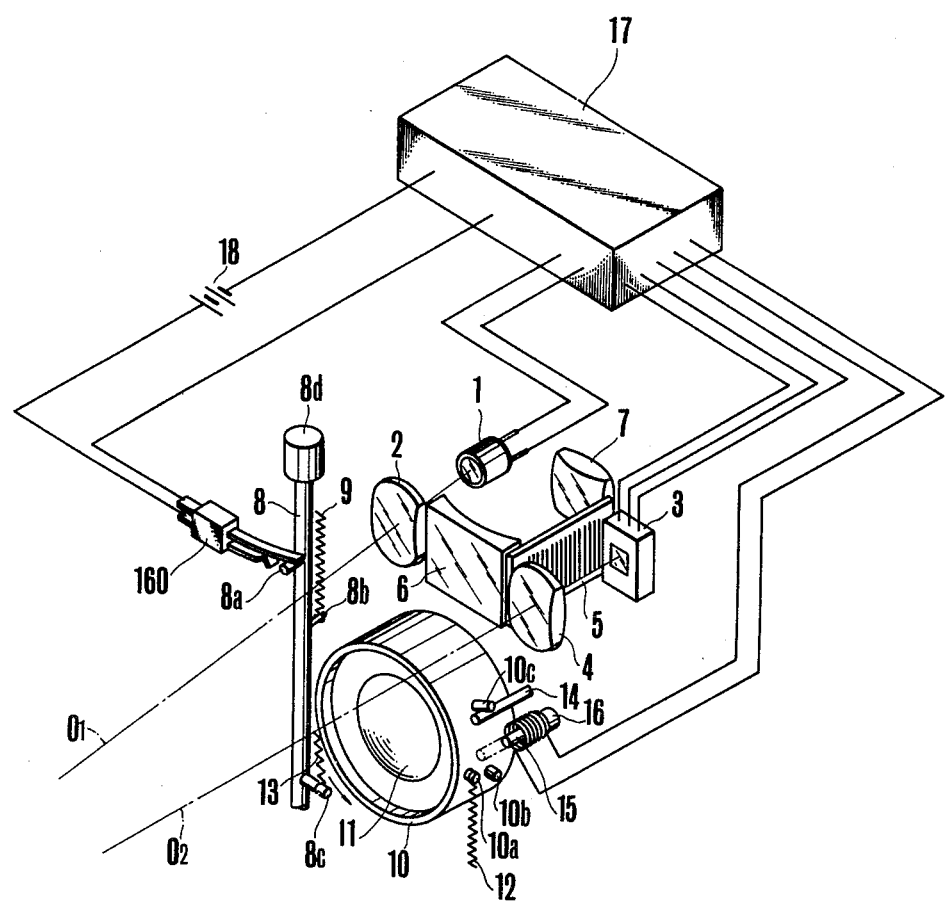
FIG. 1 shows a schematic perspective view of an embodiment of the present invention incorporated in a camera.

The present invention is next described in greater detail in connection with one embodiment thereof. In FIG. 1, element 1 is a light source (radiation source) which emits a light (radiation) beam towards an object to be photographed; element 2 is a projection lens for defining an angle of projection of the light beam emitted from the source 1; element 3 is a light-sensitive element (radiation sensor element), for example, a silicon photocell; element 4 is a collector lens for defining an angle of collection of the reflected light from the object to the light sensitive element 3. It is noted here that the light source 1, light sensitive element 3 and two lenses 2 and 4 are so arranged as illustrated in FIG. 1 that a projection optical axis 01 of the light projecting means (radiation projecting means) composed of the light source 1 and lens 2 and a reception optical axis 02 of the light receiving means (radiation sensing means) composed of the light sensitive element 3 and lens 4 intersect each other at a certain finite distance, for example, such a distance as to correspond approximately to a near distance zone focus setting of an objective lens. It is also noted that, for use as the light source, it is preferred to make use of such an element which emits infrared or near infrared radiation, for example, IRED (Infrared Ray Emitting Diode). Therefore, for use as the light sensitive element, it is preferred to make use of one which has a spectral sensitivity characteristic with the peak at the infrared or near infrared region.

Element 5 is a shield wall for preventing the light from the light source 1 from directly impinging on the light sensitive element 3 by diffraction; element 6 is a finder objective lens; element 7 is a finder eye-piece lens; element 8 is a camera release rod which is guided in axial directions by a portion of a camera housing (not shown). Affixed to said release rod 8 are pins 8a, 8b and 8c; element 9 is a spring connected at its one end to the pin 8b and at its other end to the camera housing (not shown) to urge the release rod 8 in an upward direction; element 10 is an objective lens barrel rotatably supported by a certain means (not shown) in a manner known in the art. It is noted that as the barrel 10 turns, an objective lens 11 is caused to move axially, thereby focus adjustment is performed as is known in the art. That is, here, rotative movement of the barrel 10 in a direction indicated by arrow causes the objective lens 11 to be focused from near to farther object distances; element 12 is a return spring connected at its one end to a pin 10a planted on the objective lens barrel 10 and at its other end to the camera housing (not shown); element 13 is a spring connected at its one end to the pin 8c on the release rod 8 and at its other end to a pin (not shown) affixed to a portion of the objective lens barrel 10; element 14 is a stopper planted on the camera housing (not shown) and functioning as a rotation range limiting member for the objective lens barrel 10, said stopper 14 selectively engaging with pins 10b and 10c affixed to planted on the objective lens barrel 10; element 16 is a solenoid coil with its iron core 15 upon energization of said coil 16 to fly into an engageable position with the pin 10b on the objective lens barrel 10 as illustrated by dot-and-dash lines in FIG. 1 and upon de-energization to retract to a position where rotative movement of the objective lens barrel 10 is not hindered as illustrated by solid lines. Element 160 is an electrical power source switch which is normally opened as one of two contacts is pushed upward by the pin 8a on the release rod 8 and when the release rod 8 is pushed inwards, is closed by its own habit; element 17 is a signal processing circuit to be described later; element 18 is an electrical power source or battery.

Figure 2:
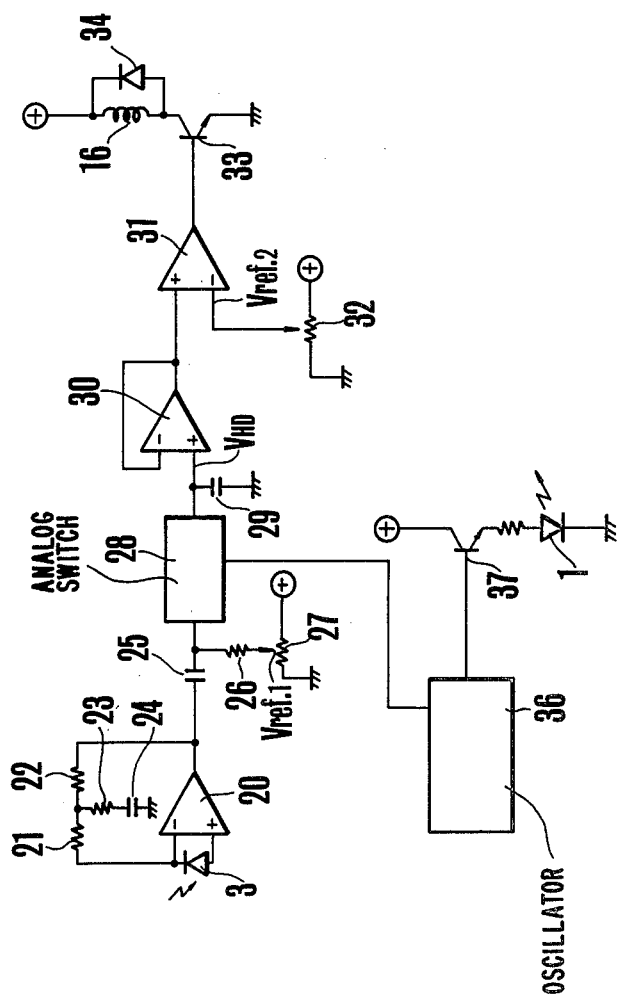
FIG. 2 shows an electrical circuit diagram of the device of FIG. 1.

In the electrical circuitry of FIG. 2, element 3 is the light sensitive element of FIG. 1; element 20 is an operational amplifier; elements 21, 22 and 23 are resistors connected in the feedback path of said operational amplifier 20; element 24 is a condenser with its one pole connected to the circuit standard level and with its opposite pole connected to the resistor 23, the resistors 21, 22 and 23 and condenser 24 constituting a T-type low-pass-filter; 25 and 26 are a condenser and a resistor respectively constituting a high-pass-filter; element 27 is a voltage divider for setting a voltage level Vref.1 as a reference, at the time of no signal; element 28 is an analog switch for pulsating a signal to a signal holding condenser 29 in synchronism with the clock pulses from an oscillator 36 to be described later; element 30 is a buffer amplifier; element 31 is a comparator for comparing a voltage Vref.2 (>Vref.1) set by a voltage divider 32 with an output voltage ($V_{HD}$) of the buffer amplifier 30; element 33 is an npn-switching transistor for controlling drive current flowing through the aforesaid solenoid coil 16; element 34 is a diode for absorbing counter electromotive force produced at a moment when the current supply to the solenoid coil 16 is cut off; element 37 is an npn-transistor for controlling light-emitting current connected in a current supply path to the light source 1 (here in the form of an infrared ray emitting diode). It is noted that the various elements of FIG. 2 are arranged to be supplied with current from the battery 18 through the electrical power source switch 160 shown in FIG. 1.

The operation of the camera of such construction is next described by reference to the voltage waveforms of FIGS. 3 and 4.

When the photographer pushes down a release button 8d, the release rod 8 is moved downwards, thereby the electrical power source switch 160 is first closed to supply current to the signal processing circuit 17. As a result, the light source 1 is driven by the clock pulses from the oscillator 36 through the transistor 37 at a frequency of, for example, about 10 KHz, repeating the lighting on and off. And, the light from the light source 1 is collimated and projected by the projection lens 2 towards an object to be photographed. The reflected projection light from the object is collected by the lens 4 and is caused to be incident on the light sensitive element 3. At this time, the light sensitive element 3 produces an output signal corresponding to the amount of light received which is then amplified by the amplifier 20. It is noted that at this time, in the output signal of the light sensitive element 3, there are high frequency components corresponding to the light emitting frequency of the light source 1, or about 10 KHz which are amplified at a high amplification degree and low frequency components corresponding to the ambient light such as daylight which are amplified at a low amplification degree, by the action of the T-type low-pass-filter composed of the resistors 21, 22 and 23 and condenser 24. Then, of the signal components amplified by the amplifier 20 in the above-described manner, the main signal of about 10 KHz passes through the high-pass-filter composed of the condenser 25 and resistor 26 and therefrom applied to the analog switch 28. By said analog switch 28 intermittently passing the input signal therethrough in synchronism with the clock pulses from the oscillator 36, those of the output signals of the light sensitive element 3 which are produced when the light source 1 is lighted on are sampled, permitting electrical charges corresponding to the passed signals to be accumulated on the condenser 29.

Figure 3:
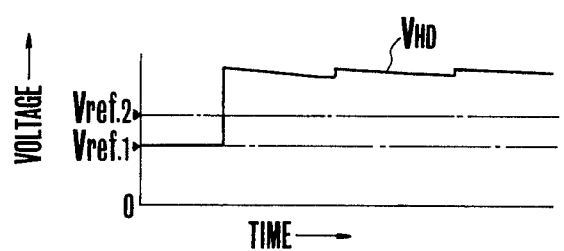
FIG. 3 shows a waveform of voltages at the various portions of the circuit of FIG. 2 with an object at a near distance.
Figure 4:
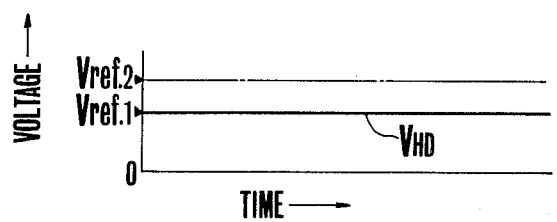
FIG. 4 shows a waveform of voltages at the various portions of the circuit of FIG. 2 with an object at a far distance.

Now assuming that the object lies at a relatively near distance, then the voltage $V_{HD}$ held in the sample and hold circuit composed of the analog switch 28 and condenser 29 becomes higher than the voltage Vref.2 set on the voltage divider 32 as illustrated in FIG. 3. Since, therefore, the plus input of the comparator 31 becomes higher than the minus input, the output of said comparator 31 takes on a high level at which the transistor 33 is rendered conducting. Thus, the coil 16 is supplied with current. When the coil 16 is energized, its iron core 15 is plunged from the position illustrated by the solid lines to the position illustrated by the dot-and-dash lines in FIG. 1. After that, upon further depression of the release rod 8, the spring 13 overcomes the spring 12, initiating a rotative movement of the objective lens barrel 10 in a direction indicated by the arrow in FIG. 1. At an intermediate point during the rotation of the barrel 10, the pin 10b engages with the iron core 15, thereby the objective lens barrel 10 is prohibited from its further rotation at a first position. At this time, the objective lens 11 is stopped in a position corresponding to a predetermined, relatively near distance. Thus, focus adjustment to a near distance zone is automatically achieved. After that, when the release rod 8 is furthermore depressed, a mechanism (not shown) actuates a shutter (not shown), thus completing the shot.

Conversely, when the object lies at a relatively far distance, the amount of that part of the light from the light source 1 which is reflected from the object to the light sensitive element 3 is either reduced, or is almost zero. Since, therefore, as illustrated in FIG. 4, the hold voltage $V_{HD}$ on the condenser 29 in the aforesaid signal processing circuit 17 becomes almost equal to the voltage level Vref.1, which occurs at the time of no signal by the voltage divider 27 defining the bias level for the high-pass-filter composed of the condenser 25 and resistor 26, and does not exceed the voltage Vref.2 set on the voltage divider 32, the solenoid coil 16 is not supplied with current. Therefore, upon further depression of the release rod 8, as the spring 13 overcomes the spring 12, the objective lens barrel 10 is turned until the pin 10b abuts the stopper 14. Thus, the objective lens barrel 10 is prohibited from rotation at a second position. At this time, the objective lens 11 is stopped in a position corresponding to a relatively far distance, where focus adjustment to a far distance zone is obtained. Then, when the release rod 8 is furthermore depressed, a photographic operation similar to the above proceeds.

After the termination of the photographic operation, when the pressure of the release button 8d is removed, the release rod 8 is lifted upwards to the initial position by the action of the spring 9. Since, at this time, therefore, the return spring 12 overcomes the spring 13, the barrel 10 is turned in the reversed direction to that indicated by the arrow in FIG. 1 until its pin 10c engages with the stopper 14, thus regaining the initial position of FIG. 1. Such lens barrel driving system is simple in structure and is of high utility value.

A modified embodiment according to the present invention will be described with reference to FIG. 5 and FIG. 6.

The difference between the foregoing embodiment and this modified embodiment is that, first for the purpose of avoiding the adverse effects due to the unstability in the voltage level immediately after the connection to a power source, the zone detection operation is prohibited for a predetermined period of time immediately after the connection to the power source, and secondly for the purpose of saving the power, the zone detection after its prohibition is performed only for a predetermined period of time. Regarding the method for cancelling the exterior light noise, there is also slight difference in that the outputs of the light receiving element 3 respectively corresponding to the turn-on and turn-off of the light source 1 are sampled and held to determine the difference between these outputs.

Figure 5:
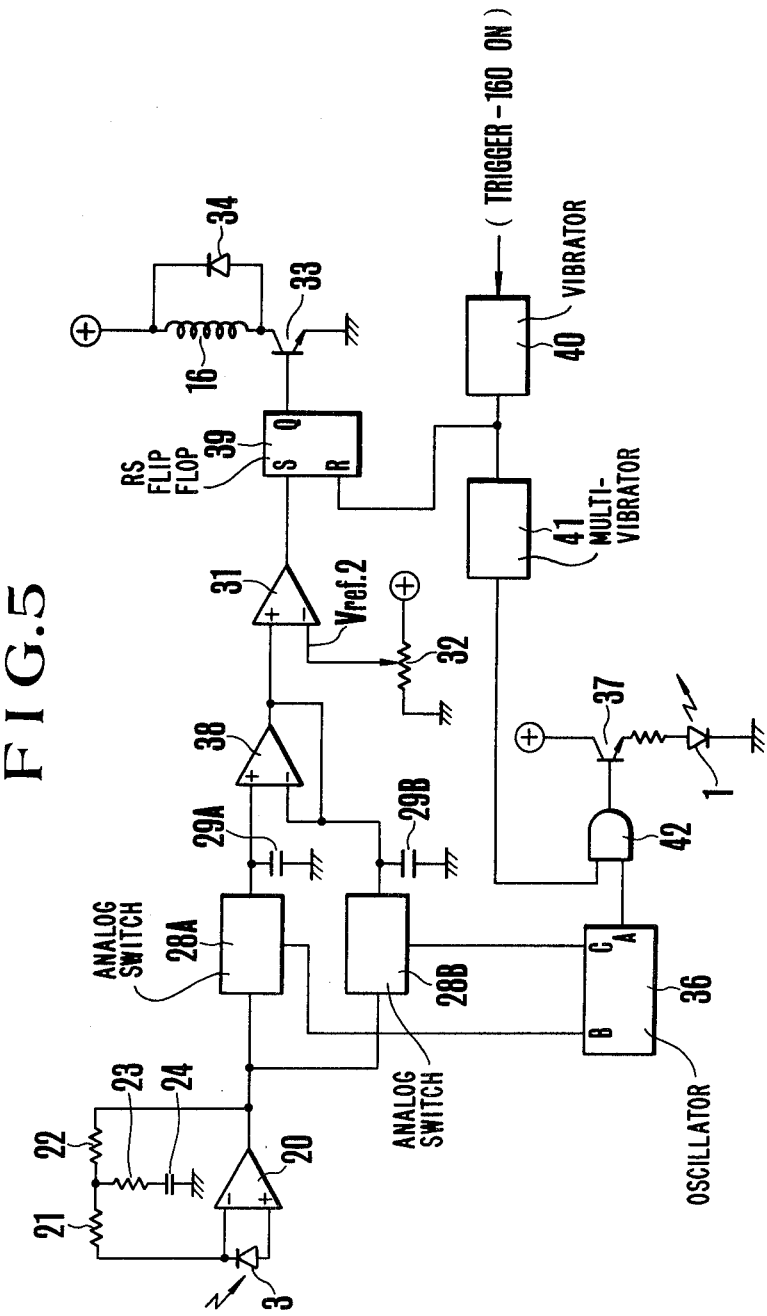
FIG. 5 shows an electrical circuit diagram for a modified embodiment of the present invention.

In FIG. 5, the same numerical references as in FIG. 2 indicate the same members and elements as shown in FIG. 2, and for simplification of the explanation, their descriptions are omitted so far as the embodiment can be understood.

Elements 28A and 28B represent respectively an analog switch, each being controlled by clock pulses B and C respectively (in FIGS. 6(d) and 6(e)) from the oscillator 36.

Elements 29A and 29B represent respectively a condenser for holding outputs of the analog switches 28A and 28B, each constituting a sample-holding circuit together with the analog switches 28A and 28B respectively. Element 38 is a differential amplifier for determining the difference between the values held by the condensers 29A and 29B.

As understood from the comparison of the outputs A, B and C from the oscillation 36 shown in FIGS. 6(c), 6(d) and 6(e), if the light source 1 is turned on to illuminate by the high level of the output A, an output of the amplifier 20 corresponding to the illumination of the light source 1 is held in the condenser 29A, while an output of the amplifier 20 corresponding to the turn-off state of the light source 1, namely an output corresponding to the exterior light is held in the condenser 29B, so that a light-reception output with the exterior light level being fully cancelled is obtained from the amplifier 38. The output of the differential amplifier 38 is added to the plus input of the comparator 31 mentioned hereinbefore.

Element 39 is an RS-type flip-flop with reset preference to receive the output of the comparator 31 at its set input S, and the base of the transistor 33 for controlling current passage to the coil 16 is connected to the output Q of the flip-flop.

Element 40 is a mono-stable multi-vibrator designed to provide a high level signal for a predetermined period of time $t_1$ shown in FIG. 6(a) by being triggered at the time of turn-on of the power switch 160, and element 41 is a mono-stable multi-vibrator designed to provide a high level signal for a predetermined period of time $t_2$ shown in FIG. 6(b) by being triggered by the falling of the output of the vibrator 40. The output of the multi-vibrator 40 is given also to the reset input R of the flip-flop 39, and the output of the multi-vibrator 41 is given to an AND gate 42 receiving the output A of the oscillator 36. The output (in FIG. 6(f)) of the AND gate 42 is supplied to the base of the transistor 37 to drive the light source 1.

According to the above embodiment, until the time $t_1$ lapses after the turn-on of the power source switch 160, the flip-flop 39 is forcedly maintained in a reset state, and the illumination of the light source 1 is also kept off so that the object zone detection operation is not performed at all. Then when the illumination of the light source 1 is performed during the time $t_2$, the zone detection is performed, and results of the detection are memorized in the flip-flop 39, and the stopping position of the lens 11 is controlled on the basis of the memorized signal. In this connection, the time $t_1$ should be long enough for stabilization of the power source voltage level after the connection to the switch 160, and also the time $t_2$ should be long enough for assuring correct zone detection.

Thus, according to the embodiment described above, it is possible to satisfactorily eliminate the adverse effects due to the instability of the voltage level immediately after the turn-on of the power source switch and to save the power consumption substantially.

In general, with the projector and sensor integrally fixed in position, when it is intended to discriminate the object distance depending upon the magnitude of the output signal level of the sensor, what must be taken into account is the fact that the amount of the part of the signal light emitted from the projector and returned to the sensor is proportional to the reflective index of the object, and that when the axes of the projector and sensor are in common, in is inversely proportional to the square of the object distance. Therefore, even for an object at a far distance, when it has a high reflective index, it is liable to an erroneous judgment at a near distance. Conversely, when an object of low reflective index lies at a near distance, it is liable to erroneous judgment at a far distance. Taking these facts into consideration, the present invention is intended to arrange the light projecting means (1, 3) and the light receiving means (2, 4) in separation from each other by a predetermined base line length, thereby giving an advantage that for the object at the far distance, no matter how the high reflective index it may have it becomes hardly liable to erroneous judgment at a near distance. Although, in principle, the accuracy loss due to the reflective index of the object cannot be completely saved, it is possible to limit it to a fully acceptable degree from the practical use standpoint. It is noted that the experimental results suggest that it is desirable to fulfill the following requirement: $d \geq (R/f) \times (D/4)$ where f is the focal length of the projection lens 2; R is the boundary distance on the design of the far distance zone and the near distance zone; D is the width of the light emitting area along the base line; and d is the base line length. Also according to the experiments, it has been determined that it is preferred to make the set position of the objective lens for the near distance zone focus setting correspond almost to the distance at which the axes of the light projecting and receiving means intersect each other. In this case, it is advantageous in design that with the objective lens adjusted in position to the far distance zone focus setting, the distances longer than one half of the set distance up to infinity are included in an acceptable focusing range by virtue of the depth of field of said lens. By the way, the set distance of the lens in this case is called the "hyper focal distance". Taking one example of the lens having the hyper focal distance at 4 m with the set distance for the near distance zone focus setting at about 1.5 m, then this setting assures that the range of about 1 m to 2 m is focusable, on the other hand, with the set distance for the far distance zone focus setting at 4 m equal to the hyper focal distance, this setting assures that the range of about 2 m to infinity is focusable.

As has been described above, according to the present invention, the automatic focus adjustment can be carried out by a very simple mechanism and electrical circuit so that a very low price is realized, while still obtaining a sufficient accuracy of focusing control for devices such as cameras in ordinary photographic situations.

What is claimed is:

1. An apparatus for setting a lens means to one of a plurality of distinct positions on an optical axis thereof in correspondence to an object distance, said apparatus comprising:
   (A) radiation projecting means for projecting a beam of radiaton towards an object;
   (B) radiation receiving means for receiving radiation reflected by the object, said receiving means being disposed at a distance of a predetermined base line length from said projecting means and having a radiation sensor which produces an electrical output corresponding to the received radiation;
   (C) circuit means for determining, on the basis of the output of said sensor in said receiving means, a position out of said plurality of distinct positions where said lens means is to be set;
   (D) manually operable driving means for driving said lens means from a predetermined initial position toward the position determined by said circuit means;
   (E) resetting elastic means for automatically resetting the lens means to said initial position when manual operation to said driving means is released;
   (F) locking means for locking the lens means at the initial position against the urging force of the resetting elastic means; and
   (G) engagement means engageable with the lens means and contactable to a position discriminated by said circuit means, said engagement means shifting in accordance with an output from said circuit means, and the contact position of the lens means being determined in accordance with the shifting of the engagement means.

2. The apparatus according to claim 1, wherein said radiation projecting means is arranged to project a radiation beam modulated with a predetermined frequency, and said circuit means includes means for extracting signal components responding to the projected radiation beam projected from the projecting means from the output of said radiation sensor in said radiation receiving means.

3. The apparatus according to claim 1 or 2, wherein said radiation projecting means has a radiation projecting axis and said radiation receiving means has a radiation receiving axis which intersects the radiation projecting axis of the projecting means at a predetermined definite distance from the apparatus.

4. The apparatus according to claim 1 or 2, wherein said plurality of distinct positions includes two distinct positions, one being for focusing the lens means onto a first range of distances from the apparatus and the other being for focusing the lens means onto a second range of distances from the apparatus.

5. The apparatus according to claim 4, wherein said radiation projecting means has a radiation projecting axis and said radiation receiving means has a radiation receiving axis which intersects the radiation projecting axis of the projecting means at a predetermined definite distance from the apparatus.

6. The apparatus according to claim 5, wherein said first range covers nearer distances from the apparatus than that covered by said second range, and said radiation receiving axis of said radiation receiving means intersects the radiation projecting axis of the radiation projecting means at the distance within the first range.

7. An apparatus according to claim 1, which further comprises:
   an electromagnetic means for shifting the engagement means in accordance with the output of the circuit means.

8. An apparatus according to claim 1, which further comprises:
   circuit closing switching means for actuating the circuit means in association with the manually operable driving means.

9. An apparatus according to claim 1, in which the manually operable driving means comprises:
   a driving elastic means for driving said lens means from said initial position to the position determined by said circuit means; and
   a manually operable member adapted for manually charging said driving elastic means to drive the lens means.

10. The apparatus according to claim 9, wherein said lens means is an objective in a photographic camera, and said manually operable member is a movable member operable manually for camera releasing.

11. An apparatus according to claim 10, which further comprising:
   switching means for starting a photographic operation of a camera in association with the manually operable member,
   said switching means being actuated in a process of further charging of the driving elastic means by the manually operable member after the manually operable member charges the driving elastic means to bring the lens means into contact with the engagement means.

* * * * *